United States Patent [19]

Moritz

[11] 4,036,824
[45] July 19, 1977

[54] DISAZO DYESTUFFS CONTAINING A-O-ALKYLENE-O-SO₃H GROUP

[75] Inventor: Karl-Ludwig Moritz, Cologne, Germany

[73] Assignee: Bayer Aktiengesellschaft, Leverkusen, Germany

[21] Appl. No.: 94,523

[22] Filed: Dec. 2, 1970

[30] Foreign Application Priority Data

Dec. 4, 1969 Germany ............................. 1960816
July 16, 1970 Germany ............................. 2035317

[51] Int. Cl.² ................... C09B 31/04; C09B 31/08; C09B 43/18
[52] U.S. Cl. .................. 260/186; 260/187; 260/206
[58] Field of Search ............... 260/174, 177, 184, 185, 260/186, 187, 191

[56] References Cited

U.S. PATENT DOCUMENTS 2,134,521  10/1938  Knight ............................. 260/186
3,096,140  7/1963   Gaetani ........................... 260/174 X

OTHER PUBLICATIONS

Venkataraman — The Chemistry of Synthetic Dyes — (Academic Press, Inc. New York, 1952), vol. I, pp. 323, 457, 458, 460, 461, 343, 348, vol. IV, p. 55.

Primary Examiner—Charles F. Warren
Attorney, Agent, or Firm—Plumley and Tyner

[57] ABSTRACT

Disazo dyestuffs of formula

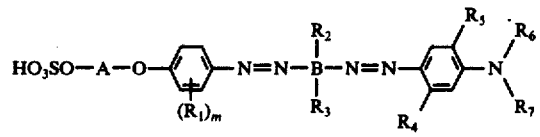

in which,
A represents an alkylene radical with 2 – 5 C atoms,
$R_1$, $R_2$, $R_3$ and $R_5$ represent hydrogen, chlorine, bromine, an alkoxy group or an alkyl group,
$R_4$ represents hydrogen, chlorine, bromine, alkyl, alkoxy or acylamino,
$R_6$ represents an alkyl group,
$R_7$ represents hydrogen or an alkyl group,
B represents a 1,4-phenylene or 1,4-naphthylene radical and
m represents the numbers 1 – 4, and their use for the dyeing of nitrogen-containing materials, such as wool and silk, but preferably for dyeing synthetic polyamide and polyurethane fibres. Dyeings obtained are characterized by good to very good general fastness properties.

2 Claims, No Drawings

DISAZO DYESTUFFS CONTAINING A-O-ALKYLENE-O-SO₃H GROUP

The subject of the invention are new disazo dyestuffs, containing sulphonic acid groups, of formula

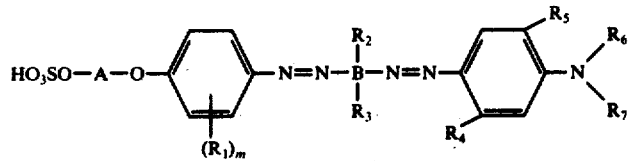

(I)

in which

A represents an alkylene radical with 2 - 5 C atoms, $R_1$, $R_2$, $R_3$ and $R_5$ represents hydrogen, chlorine, bromine, an alkoxy group or an alkyl group, $R_4$ represents hydrogen, chlorine, bromine, alkyl, alkoxy or acylamino, $R_6$ represents an alkyl group, $R_7$ represents hydrogen or an alkyl group, B represents a 1,4-phenylene or 1,4-naphthylene radical and $m$ represents the numbers 1 - 4, as well as their manufacture and use for dyeing nitrogen-containing fibre materials.

Preferred dyestuffs are here those of formula

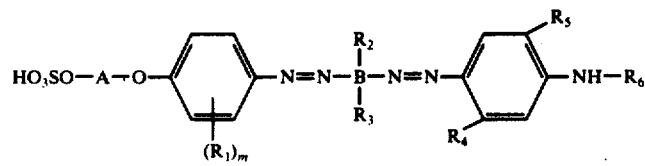

(II)

in which

A represents an alkylene radical with 2 - 5 C atoms, $R_1$, $R_2$, $R_3$ and $R_5$ represent hydrogen, chlorine, bromine, an alkoxy group or an alkyl group, $R_4$ represents hydrogen, chlorine, bromine, alkyl, alkoxy or acylamino, $R_6$ represents an alkyl group, B represents a 1,4-phenylene or 1,4-naphthylene radical and $m$ represents the numbers 1 - 4, as well as those of formula

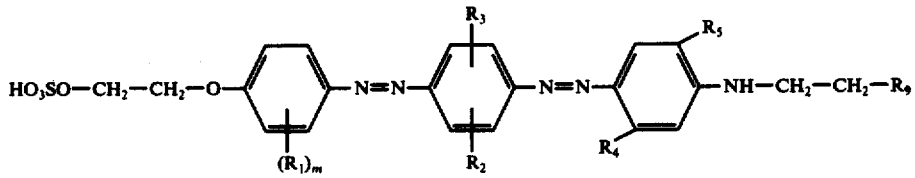

(III)

in which $R_9$ represents hydrogen, hydroxyl, nitrile, halogen, alkoxycarbonyl, or $R_1$ - $R_5$ as well as $m$ have the abovementioned meaning, and also those of formula

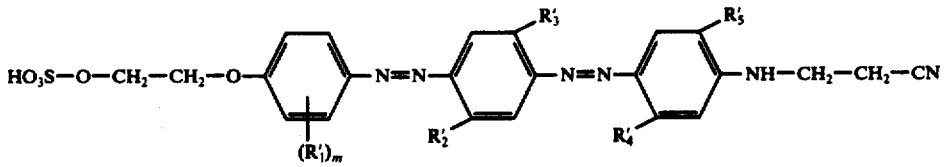

(IV)

in which $R_1'$ represents hydrogen, chlorine or a methyl group, $R_2'$ represents hydrogen, chlorine, or a methyl or methoxy group, $R_3'$ represents hydrogen or a methoxy group, $R_4'$ represents hydrogen, chlorine, a methyl group or a formylamino, acetylamino, hydroxyacetylamino, benzoylamino, methoxycarbonylamino or ethoxycarbonylamino, benzenesulphonylamino, toluenesulphonylamino or a methylsulphonylamino or ethylsulphonylamino radical, $R_5'$ represents hydrogen or a methyl or methoxy group and $m$ represents the numbers 1 or 2, and also those of formula (V)

-continued

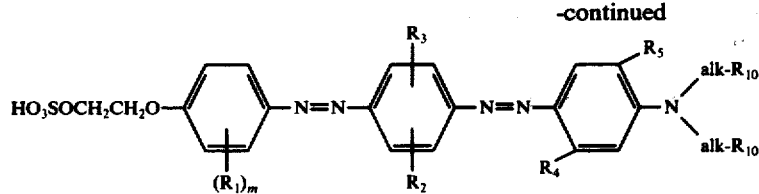

in which $R_1$ represents hydrogen, chlorine, bromine, or a methyl, ethyl, methoxy or ethoxy group, $R_2$ and $R_3$ independently of one another represent hydrogen, chlorine, bromine, or a methyl, ethyl, methoxy, or ethoxy group, $R_4$ represents hydrogen, chlorine, bromine, a methyl, ethyl, methoxy or ethoxy group of a formylamino, acetylamine, propionylamino or hydroxyacetylamine group, $R_5$ represents hydrogen or a methyl, methoxy or ethoxy group, $R_{10}$ represents hydrogen, hydroxyl, lower alkylcarbonyloxy such as methylcarbonyloxy or ethylcarbonyloxy, lower alkoxycarbonyloxy such as methoxycarbonyloxy or ethoxycarbonyloxy, nitrile, halogen and alkoxycarbonyl, such as methoxycarbonyl or ethoxycarbonyl, alk represents alkyl radical with 1 – 4 C atoms, such as $$-CH_2-, -CH_2-CH_2-, -\underset{\underset{CH_3}{|}}{CH}-CH_2-, -CH_2-CH_2-CH_2-,$$

$$\underset{\underset{CH_3}{|}}{CH}-CH_2-CH_2-, -CH_2-\underset{\underset{CH_3}{|}}{CH}-CH_2-, -CH_2-CH_2-\underset{\underset{CH_3}{|}}{CH}-, -CH_2-CH_2-CH_2-CH_2-$$

and $m$ represents an integer from 1 – 4, and also those of formula

Suitable radicals B are above all radicals of formula

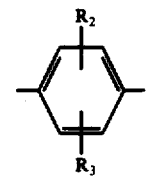

in which $R_2$ and $R_3$ have the abovementioned meaning.

Suitable alkyl radicals $R_6$ and $R_7$ are, for example, alkyl groups with 1 – 4 C atoms which are optionally substituted by hydroxyl, nitrile, halogen, alkoxycarbonyl or acyloxy groups, with possible alkoxycarbonyl groups being especially those with 1 – 4 C atoms in the alkoxy group, possible halogen being especially chlorine and bromine and possible acyloxy groups being especially alkylcarbonyloxy, arylcarbonyloxy and alkoxycarbonyloxy groups with 1 – 4 C atoms in the alkyl

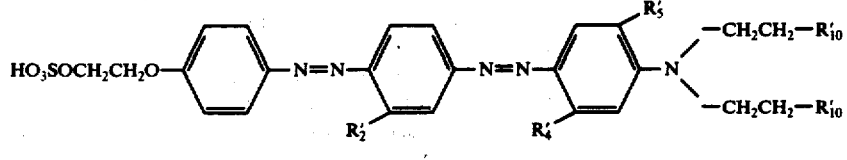

(VI)

in which $R'_2$ represents hydrogen or a methyl group, $R'_4$ represents hydrogen, a methyl group or an acetylamino group, $R'_5$ represents hydrogen or a methyl, methoxy or ethoxy group and $R'_{10}$ represents hydrogen, chlorine, nitrile, an acetoxy- or a methoxycarbonyloxy group.

Suitable alkyl and alkoxy groups $R_1 - R_7$ are especially those with 1 – 4 C atoms. These radicals can possess further substituents, such as chlorine, hydroxyl, nitrile and the like.

The radicals $R_1$ can be identical or different.

Suitable radicals A are for example:

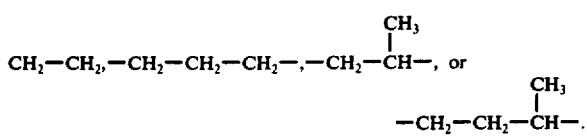

or alkoxy group.

Suitable optionally substituted alkyl groups $R_6$ and $R_7$ are here especially those of formula —Alk—$R_8$ in which Alk represents

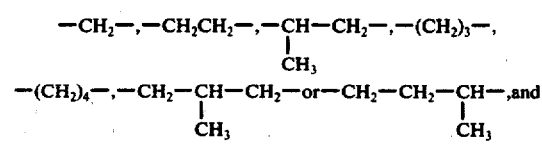

$R_8$ denotes hydrogen or one of the abovementioned substituents.

Suitable acylamino groups are for example formylamino, alkylcarbonylamino, arylcarbonylamino, alkylsulphonylamino, arylsulphonylamino, alkoxycarbonylamino, and aminocarbonylamino groups, especially those with 1 – 4 C atoms in the alkyl or alkoxy group, such as acetylamino, hydroxyacetylamino, cyanacetylamino, propionylamino, methylsulphonylamino, ethylsulphonylamino, phenylsulphonylamino, methoxycarbonylamino, ethoxycarbonylamino and benzoylamino groups.

The new disazo dyestuffs (I) are manufactured by diazotising amines of formula

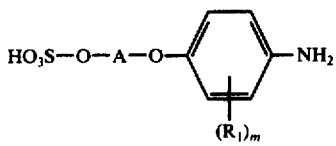
(VII)

in which $R_1$, $m$ and A have the abovementioned meaning, and reacting them with amines of formula

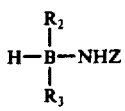
(VIII)

in which $R_2$, $R_3$ and B have the abovementioned meaning and Z represents H, —SO$_3$H or —CH$_2$SO$_3$H, to give monoazo dyestuffs of formula

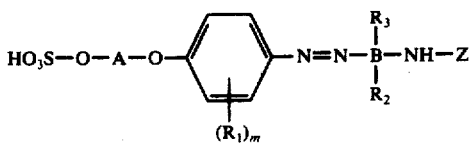
(IX)

diazotising the monoazo dyestuffs thus obtained, after splitting off the group Z, if necessary, by alkaline or acid saponification, and coupling with an amine of formula

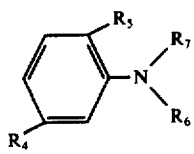
(X)

in which $R_4$ to $R_7$ have the abovementioned meaning.

A further process for the manufacture of the dyestuffs (I) consists of diazotising amines of formula

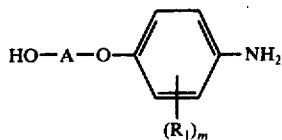
(XI)

in which

A, $R_1$ and $m$ have the abovementioned meaning, and coupling them with amines of formula (VIII) to give monoazo dyestuffs of formula

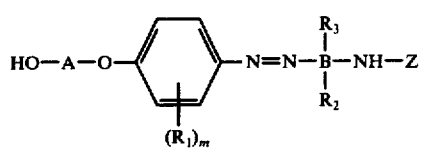
(XII)

diazotising after splitting off the radical Z by acid or alkaline saponification, coupling with an amine of formula (X), and subsequently converting the disazo dyestuffs thus obtained, of formula

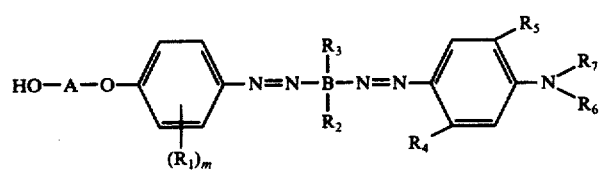
(XIII)

in which $R_1$ – $R_7$, A, B and $m$ have the abovementioned meaning, into the dyestuffs (I) by means of sulphonating agents such as concentrated sulphuric acid, sulphuric acid monohydrate or oleum.

A further variant of the process according to the invention for the manufacture of the disazo dyestuffs (I) consists of converting the monoazo dyestuffs of formula (XII) into the dyestuffs of formula (IX) by means of sulphonating agents such as concentrated sulphuric acid, sulphuric acid monohydrate or oleum, diazotising, and coupling with amines of formula (X).

Suitable amines of formula (XI) are, for example: ethylene glycol-(4-aminophenyl)-ether, trimethylene glycol-(4-aminophenyl)-ether, propylene glycol-(4-aminophenyl)-ether, ethylene glycol-(2-methyl-4-aminophenyl)-ether, trimethylene glycol-(2-methyl-4-aminophenyl)-ether, propylene glycol-(2-methyl-4-aminophenyl)-ether, ethylene glycol-(3-methyl-4-aminophenyl)-ether, trimethylene glycol-(3-methyl-4-aminophenyl)-ether, ethylene glycol-(2-ethyl-4-aminophenyl)-ether, ethylene glycol-(3-ethyl-4-aminophenyl)-ether, trimethylene glycol-(3-ethyl-4-aminophenyl)-ether, ethylene glycol-(2-methoxy-4-aminophenyl)-ether, trimethylene glycol-(2-methoxy-4-aminophenyl)-ether, ethylene glycol-(3-methoxy-4-aminophenyl)-ether, trimethylene glycol-(3-methoxy-4-aminophenyl)-ether, ethylene glycol-(2-ethoxy-4-aminophenyl)-ether, ethylene glycol-(3-ethoxy-4-aminophenyl)-ether, ethylene glycol-(2-chlor-4-aminophenyl)-ether, trimethylene glycol-(2-chlor-4-aminophenyl)-ether, propylene glycol-(2-chlor-4-aminophenyl)-ether, ethylene glycol-(3-chlor-4-aminophenyl)-ether, trimethylene glycol-(3-chlor-4-aminophenyl)-ether, ethylene glycol-(2-brom- 4-aminophenyl)-ether, ethylene glycol-(3-brom-4-aminophenyl)-ether, ethylene glycol-(2,5-dimethyl-4-aminophenyl)-ether, trimethylene glycol-(2,6-dimethyl-4-aminophenyl)-ether, ethylene glycol-(2,6-dimethyl-4-aminophenyl)-ether, trimethylene glycol-(2,6-dimethyl-4aminophenyl)-ether, ethylene glycol-(2,3-dimethyl-4-aminopheny)-ether, ethylene glycol-(3,5-dimethyl-4-aminophenyl)-ether, ethylene glycol-(2,3,5-trimethyl-4-aminophenyl)-ether, trimethylene glycol-(2,3,5-trimethyl-4-aminophenyl)-ether, ethylene glycol-(2,3,5,6-tetramethyl-4-aminophenyl)-ether, ethylene glycol-(2,5-dichlor-4-aminophenyl)-ether, ethylene glycol-(2,6-dichlor-4-aminophenyl)-ether, trimethylene glycol-(2,6-dichlor-4-aminophenyl)-ether, ethylene glycol-(2-chlor-4-amino-5-methoxyphenyl)-ether, trimethylene glycol-(2-chlor-4-amino-5-methylphenyl)-ether and their acid sulphuric acid esters.

Suitable middle components of formula (VIII) are for example: aniline, 2-aminotoluene, 3-aminotoluene, 2-amino-ethylbenzene, 3-amino-ethylbenzene, 3-chloraniline, 3-brom-aniline, 2-aminoanisole, 3-aminoanisole, 2-amino-ethoxybenzene, 3-amino-ethoxybenzene, 1-amino-2,3-dimethylbenzene, 1-amino-2,5-dimethylbenzene, 1-amino-3,5-dimethylbenzene, 3-amino-4-methoxy-toluene, 2-amino-4-methoxy-toluene, 2-amino-1,4-dimethoxy-benzene, 2-amino-4-ethoxy-toluene, 2-amino-1,4-diethoxy-benzene, α-naphthylamine and their N-sulphonic acid or N-Ω-methanesulphonic acids.

Suitable end components of formula (X) are, for example: N-methyl-aniline, N-ethyl-aniline, N-n-butyl-aniline, N-β-cyanethyl-aniline, N-β-chlorethyl-aniline, n-β-hydroxyethyl-aniline, N-β-acetoxyethyl-aniline, N-β-methoxy- and N-β-ethoxycarbonyloxyethyl-aniline, N-β-carbomethoxyethyl-aniline, N-β-cyanethyl-2-methyl-aniline, N-methyl-m-toluidine, N-ethyl-m-toluidine, N-β-cyanethyl-m-toluidine, N-β-chlorethyl-m-toluidine, N-β-hydroxyethyl-m-toluidine, N-β-acetoxyethyl-m-toluidine, Nβ-methoxycarbonyloxyethyl-m-toluidine, N-ethyl-3-ethyl-aniline, N-n-propyl-3-ethyl-aniline, N-β-cyanethyl-3-ethyl-aniline, N-β-cyanethyl-3-methoxy-aniline, N-β-chlorethyl-3-methoxy-aniline, N-β-cyanethyl-3-ethoxy-aniline, .N-β-chlorethyl-3-ethoxy-aniline, N-ethyl-3-chlor-aniline, N-β-cyanethyl-3-chlor-aniline, N-β-chlorethyl-3-chlor-aniline, N-β-hydroxyethyl-3-chlor-aniline, N-β-acetoxyethyl-3-chlor-aniline, N-β-cyanethyl-3-brom-aniline, N-ethyl-N'-formyl-m-phenylenediamine, N-ethyl-N'-acetyl-m-phenylenediamine, N-β-cyanethyl-N'-formyl-m-phenylenediamine, N-β-cyanethyl-N'-acetyl-m-phenylenediamine, N-β-cyanethyl-N'-hydroxyacetyl-m-phenylenediamine, N-β-cyanethyl-N'-propionyl-m-phenylenediamine, N-β-cyanethyl-N'-benzoyl-m-phenylenediamine, N-β-cyanethyl-N'-methoxycarbonyl-m-phenylenediamine, N-β-cyanethyl-N'-ethoxycarbonyl-m-phenylenediamine, N-β-cyanethyl-N'-benzenesulphonyl-m-phenylenediamine, N-β-cyanethyl-N'-toluenesulphonyl-m-phenylenediamine, N-β-cyanethyl-N'-methylsulphonyl-m-phenylenediamine, N-β-cyanethyl-N'-ethylsulphonyl-m-phenylenediamine, N-β-chlorethyl-N'-acetyl-m-phenylenediamine, N-β-hydroxyethyl-N'-acetyl-m-phenylenediamine, N-β-acetoxyethyl-N'-acetyl-m-phenylenediamine, N-β-methoxycarbonyloxyethyl-N'-acetyl-m-phenylenediamine, N-β-carbomethoxyethyl-N'-acetyl-m-phenylenediamine, N-ethyl-2-methoxy-5-methyl-aniline, N-β-cyanethyl-2-methoxy-5-methyl-aniline, N-β-cyanethyl-2-ethoxy-5-methyl-aniline, N-β-cyanethyl-2,5-dimethyl-aniline, N-ethyl-2-methoxy-5-acetylamino-aniline, N-β-chlorethyl-2-methoxy-5-acetylamino- aniline, N-β-cyanethyl-2-methoxy-5-acetylamino-aniline, N-β-cyanethyl-2-ethoxy-5-acetylamino-aniline, N-β-cyanethyl-2-methoxy-5-formylamino-aniline, N-β-cyanethyl-2-methoxy-5-hydroxyacetylamino-aniline, N-β-cyanethyl-2-methoxy-5-propionylamino-aniline, N-β-cyanethyl-2-ethoxy-5-propionylamino-aniline, N-β-cyanethyl-2-ethoxy-5-hydroxyacetylamino-aniline, N-β-cyanethyl-2-methoxy-5-benzoylamino-aniline, N-β-cyanethyl-2-methoxy-5-methoxycarbonylamino-aniline, N-β-cyanethyl-2-methoxy-5-ethoxycarbonylamino-aniline, N-β-cyanethyl-2-methoxy-5-methylsulphonylamino-aniline, N-β-cyanethyl-2-methoxy-5-ethylsulphonylamino-aniline, N-β-hydroxyethyl-2-methoxy-5-acetylamino-aniline, N-β-acetoxyethyl-2-methoxy-5-acetylamino-aniline, N-β-methoxycarbonyloxyethyl-2-methoxy-5-acetylamino-aniline and N-β-cyanethyl-2-methyl-5-acetylamino-aniline.

N,N-Dimethylaniline, N,N-diethylaniline, N-methyl-N-n-butyl-aniline, N,N-diethyl-m-toluidine, N,N-diethylamino-3-chlorobenzene, N,N-diethyl-N'-formyl-m-phenylenediamine, N,N-diethyl-N'-acetyl-m-phenylenediamine, N,N-diethyl-N'-3-propionyl-m-phenylenediamine, N,N-diethylamine-3-methoxybenzene, 1-N,N-diethylamino-2,5-dimethoxybenzene, 1-N,N-diethylamino-2,5-diethoxybenzene, 1-N,N-diethylamino-2-methoxy-3-acetylamino-benzene, N-ethyl-N-β-chlorethyl-aniline, N,N-bis-(β-chlorethyl)-aniline, N-(β-chlorethyl)-N-butyl- aniline, N-(β-chlorethyl)-N-ethyl-m-toluidine, N,N-bis-(β-chlorethyl)-m-toluidine, N-methyl-N-β-hydroxyethyl-aniline, N-ethyl-N-β-hydroxyethyl-aniline, N,N-bis-(β-hydroxyethyl)-aniline, N-butyl-N-(β-hydroxyethyl)-aniline, N,N-bis(β,γ-dihydroxypropyl)-aniline, N-ethyl-N-β-hydroxyethyl-m-toluidine, N,N-bis-(β-hydroxyethyl)-m-toluidine, 1-N-ethyl-N-β-hydroxy-ethylamino-2-methoxy-5-methylbenzene, N-ethyl-N-β-hydroxyethyl-N'-acetyl-m-phenylenediamine, N,N-bis-(β-hydroxyethyl)-N'-acetyl-m-phenylenediamine, 1-N,N-bis-(β-hydroxyethyl)-amino-2-methoxy-5-acetylamino-benzene, 1-N,N-bis-(β-hydroxyethyl)-amino-2-ethoxy-5-acetylamino-benzene, 1-N,N-bis-(β-hydroxyethyl)-amino-2-methoxy-5-propionylamino-benzene, N-ethyl-N-β-acetoxyethylaniline, N,N-bis-(β-acetoxyethyl)-aniline, N-butyl-N-β-acetoxyethylaniline, N-ethyl-N-β-acetoxyethyl-m-toluidine, N,N-bis-(β-acetoxyethyl)-m-toluidine, 1-N-ethyl-N-β-acetoxyethylamino-2-methoxy-5-methylbenzene, N-ethyl-N-β-acetoxyethyl-N'-acetyl-m-phenylenediamine, N,N-bis-(β-acetoxyethyl)-N'-acetyl-m-phenylenediamine, 1-N,N-bis-(β-acetoxyethyl)-amino-2-methoxy-5-acetylamino-benzene, 1-N,N-bis-(β-acetoxyethyl)-amino-2-ethoxy-5-acetylamino-benzene, 1-N,N-bis-(β-acetoxyethyl)-amino-2-methoxy-5-propionyl-amino-benzene, N,N-bis-(β-ethoxycarbonyloxyethyl)-aniline, N,N-bis-(β-methoxycarbonyloxyethyl)-aniline, N,N-bis-(β-ethoxycarbonyloxyethyl)-m-toluidine, N,N-bis-(β-methoxy-carbonyloxyethyl)-m-toluidine, N,N-bis-(β-ethoxycarbonyloxyethyl)-N'-acetyl-m-phenylenediamine, N,N-bis-(β-methoxycarbonyloxyethyl)-N'-acetyl-m-phenylenediamine, 1-N,N-bis-(β-ethoxycarbonyloxyethyl)-amino-2-methoxy-5-acetylaminobenzene, 1-N,N-bis-(β-methoxycarbonyloxyethyl)-amino-2-methoxy-5-acetylaminobenzene, 1-N,N-bis-(β-ethoxycarbonyloxyethyl)-amino-2-ethoxy-5 -acetylaminobenzene, 1-N,N-bis-(β-methoxycarbonyloxyethyl)-amino-2-ethoxy-5- acetylaminobenzene, N,N-bis-(β-carbomethoxyethyl)-N'-acetyl-m-phenylenediamine, N-methyl-N-β-cyanethylaniline, N,N-bis-(β-cyanethyl)-aniline, N-ethyl-N-β-cyanethyl-m-toluidine, N-ethyl-N-β-cyanethyl-N'-acetyl-m-phenylenediamine, N-β-hydroxyethyl-N-β-cyanethylaniline, N-β-acetoxyethyl-N-β-cyanethyl-m-toluidine and N-β-methoxycarbonyloxyethyl-N-β-cyanethyl-N'-acetyl-m-phenylenediamine.

The diazo components of formula (VII) as well as of formula (XI) are diazotised in a manner which is in itself known, for example in acid, aqueous solution with sodium nitrite solution at 0°-20° C, and are combined with the coupling components of formula (VIII). The coupling can be performed in neutral to strongly acid, but preferably in a weakly acid, pH range, in an aqueous or aqueous-organic medium.

The monoazo dyestuffs formed can be isolated either directly on the basis of their insolubility in water, if diazo components of formula (XI) and coupling components of formula (VIII) with Z = H are employed, or by salting out if diazo components of formulae (VII) or (XI) and coupling components of formula (VIII) with Z (XI) = SO$_3$H or —CH$_2$SO$_3$H are employed. In general, isolation of the monoazo dyestuff is, in the latter case, only necessary after the amino group of the coupling component has been liberated by alkaline or acid saponification. If diazo components of formula (VII) and coupling components of formula (VIII) with Z = SO$_3$H or —CH$_2$SO$_3$H have been employed, an alkaline treatment to liberate the amino group of the coupling component is preferred, since the acid sulphuric acid ester is stable under these conditions. An intermediate isolation of the monoazo dyestuffs is however not always necessary — they can also be diazotised further without isolation.

The further diazotisation of the aminoazo dyestuffs (IX) and (XII) with Z = H can for example be carried out in acid, aqueous dispersion with sodium nitrite solution, and the diazotisation temperatures can be between 0° and 30° C. Aminoazo dyestuffs of formula (IX) with Z = H can furthermore also be diazotised indirectly, by dissolving them in alkali, mixing with sodium nitrite solution and pouring into aqueous hydrochloric acid or mixing with hydrochloric acid. The conversion of the aminoazo dyestuff (XII) with Z = H, into the acid sulphuric acid ester can be performed by introducing (XII) into concentrated sulphuric acid, sulphuric acid monohydrate or oleum at room temperature and stirring for several hours longer. The acid sulphuric acid ester of the dyestuff can then be precipitated by introduction into ice water and isolated, or can also be further processed by direct further diazotisation.

The coupling of the diazotised aminoazo dyestuff (IX) with Z = H with the end components (X) to the disazo dyestuffs (I) also takes place in a manner which is in itself known, for example in a neutral, weakly acid or strongly acid aqueous medium or in an aqueous-organic medium. The disazo dyestuffs of formula (I) are generally rather sparingly soluble in an acid medium and can be isolated by simply filtering off, where necessary after addition of 2 - 10% of sodium chloride. If the dyestuffs are obtained in an impure form, they can be recrystallised in a known manner from hot water, with the addition of alkali where appropriate. The more sparingly soluble dyestuffs (I) isolated under acid conditions can be made easily water-soluble by mixing them with salts of strong bases and weak acids, for example trisodium phosphate, disodium hydrogen phosphate, sodium tetraborate, sodium metaphosphate, sodium metasilicate or sodium carbonate.

The coupling of the diazotised aminoazo dyestuffs (XII) with the end components (X) to the disazo dyestuffs (XIII) also takes place in a manner which is in itself known, for example in a neutral, weakly acid or strongly acid aqueous medium or in an aqueous-organic medium. The water-insoluble disazo dyestuffs (XIII) can be easily isolated by filtration. After drying, they are converted into the disazo dyestuffs (I) by introduction into concentrated sulphuric acid, sulphuric acid monohydrate or oleum and stirring for several hours longer, and these disazo dyestuffs are isolated by precipitation in ice water and filtration, and are freed of adhering sulphuric acid by subsequent washing with water or dilute alkalis.

The dyestuffs of formula (I) are suitable for dyeing nitrogen-containing materials, such as wool and silk, but preferably for dyeing synthetic polyamide and polyurethane fibres, in orange, scarlet red, bluish-tinged red, ruby and bordeaux shades having good to very good general fastness properties. The dystuffs are very well absorbed on polyamide fibres both from acid and from neutral dye baths.

In the examples which follow, parts denote parts by weight and percentages denote percentages by weight.

EXAMPLE 1

23.3 parts of the acid sulphuric acid ester of ethylene glycol-(4-aminophenyl)-ether are diazotised in aqueous solution, containing hydrochloric acid, in a known manner, and are coupled with 22 parts of m-toluidinemethanesulphonic acid at pH 3 - 3.5. After completion of coupling, the coupling solution is mixed with 4% strength sodium hydroxide solution, and heated to the boil for 1¼ to 2 hours, to split off the methanesulphonic acid radical. The aminoazo dyestuff thus formed is precipitated by neutralisation with hydrochloric acid at pH 7.5, with the separation being completed by mixing with 15% of sodium chloride, and is isolated. The monoazo dyestuff is again stirred with 300 parts of water and 30 parts of concentrated hydrochloric acid and is thereafter further diazotised with 6.9 parts of sodium nitrite (as a 30% strength aqueous solution) at 25° - 30° C. The suspension of the diazonium salt is thereafter run into a solution of 21.5 parts of N-β-cyanethyl-N'-acetyl-m-phenylenediamine in 200 parts of dilute hydrochloric acid, adjusted to pH 3.5 with sodium acetate. During the coupling, the pH value is kept at pH 3.5 with sodium acetate. After completion of the coupling, 10% of sodium chloride are added, and the dyestuff of formula

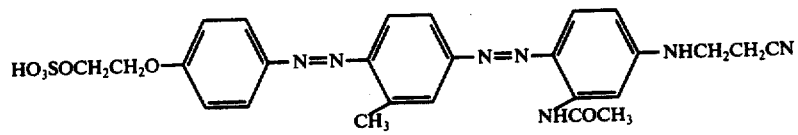

which has separated out is isolated by filtration and is dried. 55 parts of a red dyestuff powder are obtained.

DYEING EXAMPLE 0.1 g of the dyestuff is dissolved hot in 100 ml of water, 5 ml of 10% strength ammonium acetate solution are added and the mixture diluted to a volume of 500 ml with water. 10 g of polyamide fibre are introduced into the dye bath, the dye bath is brought to the boil over the course of 20 minutes, 4 ml of 10% strength acetic acid are added and the system maintained at the boil for one hour. Thereafter the goods are rinsed and dried at 70° – 80° C. The polyamide material, dyed in a clear scarlet shade, shows very good general fastness properties.

An equivalent dyeing is obtained if no acetic acid is added to the dye bath.

If instead of polyamide fibres the same amount of wool fibres are employed and in other respects the procedure described in the preceding dyeing example is followed, a clear scarlet with similar good fastness properties is obtained on this material also.

EXAMPLE 2

Following the method described in example 1, 24.7 parts of the acid sulphuric acid ester of trimethylene glycol-(4-aminophenyl)-ether are diazotised, coupled to m-toluidinemethanesulphonic acid, the methanesulphonic acid radical split off, and the product further diazotised and coupled to 21.5 parts of N-β-cyanethyl-N'-acetyl-m-phenylenediamine. After completion of coupling, the dyestuff of formula

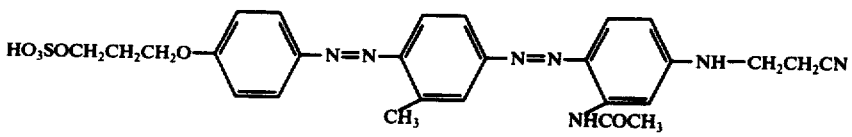

is filtered off and dried. 56 parts of a red dyestuff powder, which dyes polyamide filaments in clear scarlet shades of good to very good fastness properties, are obtained.

EXAMPLE 3

Following the method described in example 1, 23.3 parts of the acid sulphuric acid ester of ethylene glycol-(4-aminophenyl)-ether are diazotised, coupled to m-toluidinemethanesulphonic acid, the methanesulphonic acid radical then split off and the product diazotised further. The suspension of the diazonium salt is thereafter run into a solution of 23 parts of N-β-cyanethyl-2-methyl-5-acetylamino-aniline in approx. 200 parts of dilute hydrochloric acid adjusted to pH 3.5 with sodium acetate, with the pH value of the coupling solution being kept at pH 3.5 by adding sodium acetate solution. After completion of coupling, approx. 10% of sodium chloride are added and the dyestuff of formula

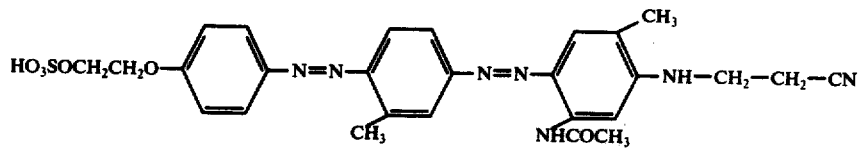

which has separated out is isolated by filtration and dried. 53 parts of a red dyestuff powder, which dyes polyamide filaments in clear yellowish-tinged red shades having good to very good fastness properties, are obtained.

EXAMPLE 4

15.3 parts of ethylene glycol-(4-aminophenyl)-ether are diazotised in hydrochloric acid solution in a known manner, and coupled to 22 parts of m-toluidinemethanesulphonic acid in the manner described in example 1. After completion of coupling, the coupling solution is mixed with 4% strength sodium hydroxide solution and stirred for half an hour at 50° C. The monoazo dyestuff which has precipitated is filtered off, stirred with 300 parts of water and 30 parts of hydrochloric acid, and diazotised at 20° – 25° C with 6.9 parts of sodium nitrite (as a 30% strength aqueous solution). The brown diazonium salt solution is filtered and added to a solution, adjusted to pH 2.5 – 3 with sodium acetate, of 15 parts of N-n-butyl aniline in approx. 200 parts of dilute hydrochloric acid, with the pH value of the coupling solution being kept at pH 3.5 – 4 by dropwise addition of sodium acetate solution. After completion of coupling, the dyestuff of formula

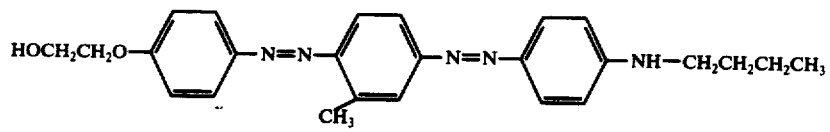

is filtered off, dried and introduced over the course of approx. 30 minutes, at 20° – 25° C, into 300 parts of concentrated sulphuric acid. The sulphuric acid solution is stirred for a further 3 hours at room temperature and is then poured out onto sufficient ice for the temperature of the mixture not to rise above 10° C. The dyestuff which has precipitated, of formula

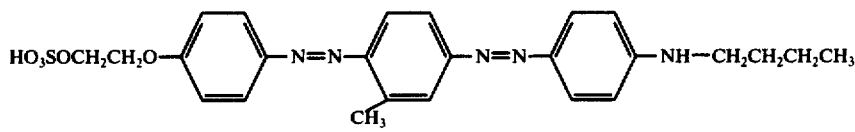

is filtered off and washed copiously with water until free of acid. It dyes polyamide filaments in orange shades having good fastness properties.

EXAMPLE 5

15.3 parts of ethylene glycol-(4-aminophenyl)-ether are diazotised as described in example 4 and coupled at pH 3 – 3.5 to a solution of 14 parts of 3-amino-4-methoxy-toluene in approx. 200 parts of dilute hydrochloric acid, with the pH value of the coupling solution being kept at pH 3 – 3.5 by means of sodium acetate solution. After completion of coupling the aminoazo dyestuff is filtered off, dried and poured into 200 parts of concentrated sulphuric acid at 20° – 25° C over the course of approx. 30 minutes. The mixture is stirred for a further 3 hours and poured out onto sufficient ice for the temperature of the mixture not to rise above 10° C. The precipitated dyestuff of formula

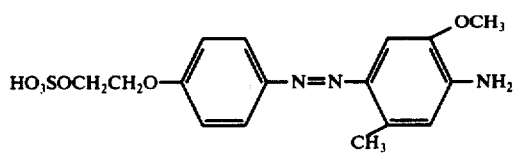

is isolated, stirred with approx. 300 parts of water and 30 parts of concentrated hydrochloric acid and diazotised at 25° – 30° C with 6.9 parts of sodium nitrite (as a 30% strength aqueous solution). The suspension of the diazonium salt is run into a solution of 25 parts of N-β-acetoxyethyl-N'-acetyl-m-phenylenediamine in approx. 200 parts of dilute hydrochloric acid, adjusted to pH 3 – 4 with sodium acetate, with the pH value of the coupling solution being kept at 3 – 4 by means of sodium acetate solution. After completion of coupling, approx. 5% of sodium chloride are added and the dyestuff of formula

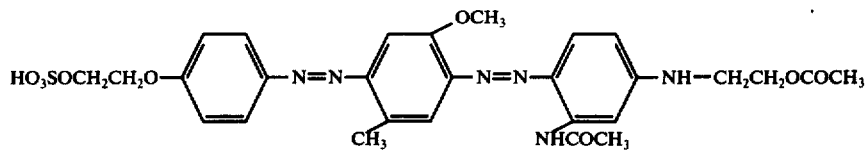

is filtered off and dried. 54 parts of a dark red powder, which dyes polyamide filaments in bluish-tinged red shades having good fastness properties, are obtained.

EXAMPLE 6

23.3 parts of the acid sulphuric acid ester of ethylene glycol-(4-aminophenyl)-ether are diazotised as described in example 1 and coupled to 14 parts of 3-amino-4-methoxy-toluene as described in example 5. After completion of coupling, the monoazo dyestuff is isolated and further diazotised as described in example 5. The suspension of the diazonium salt is run into a solution of 21.5 parts of N-β-cyanethyl-N'-acetyl-m-phenylenediamine in approx. 200 parts of dilute hydrochloric acid, adjusted to pH 3.5 by means of sodium acetate, with a pH value of 3.5 being maintained during coupling. After completion of coupling, the dyestuff of formula

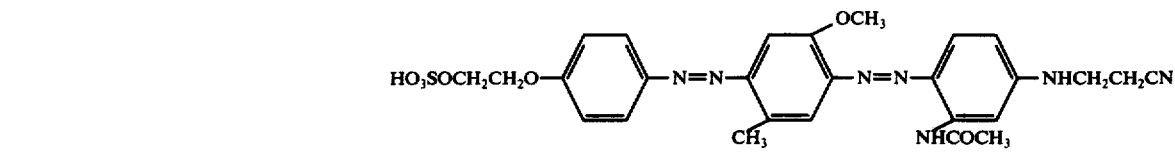

is isolated and dried. It dyes polyamide filaments in a bluish-tinged red having good to very good fastness properties.

EXAMPLE 7

26.75 parts of the acid sulphuric acid ester of ethylene glycol-(2-chlor-4-aminophenyl)-ether are diazotised in a known manner in an aqueous solution containing hydrochloric acid and, following the procedure described in example 5, coupled to 14 parts of 3-amino-4-methoxy-toluene, further diazotised and coupled to 21.5 parts of N-β-cyanethyl-N'-acetyl-m-phenylenediamine. The resulting dyestuff of formula

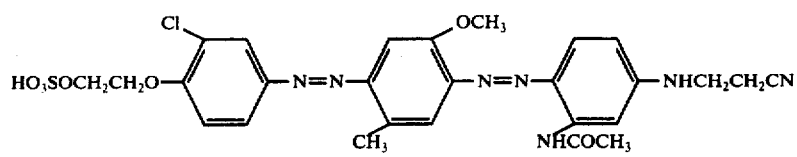

EXAMPLE 8

Following the procedure described in example 7,

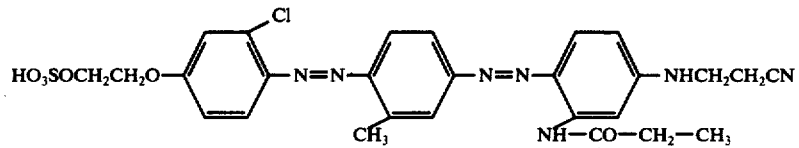

28.15 parts of the acid sulphuric acid ester of trimethylene glycol-(2-chlor-4-aminophenyl)-ether are diazotised, coupled to 14 parts of 3-amino-4-methoxy-toluene, further diazotised and coupled to 21.5 parts of N-β-cyanethyl-N'-acetyl-m-phenylene-diamine. The resulting dyestuff of formula

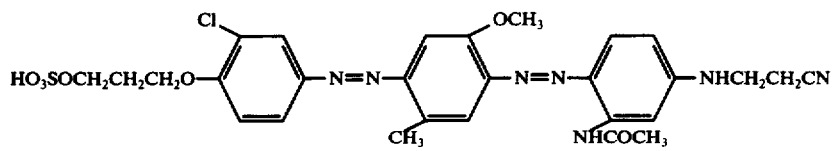

dyes polyamide materials in clear, bluish-tinged red shades having very good fastness properties.

EXAMPLE 9

Following the procedure described in example 7, 28.15 parts of the acid sulphuric acid ester of propylene glycol-(2-chlor-4-aminophenyl)-ether are diazotised, coupled to 14 parts of 3-amino-4-methoxy-toluene, further diazotised and coupled to 21.5 parts of N-β-cyanethyl-N'-acetyl-m-phenylenediamine. The resulting dyestuff of formula

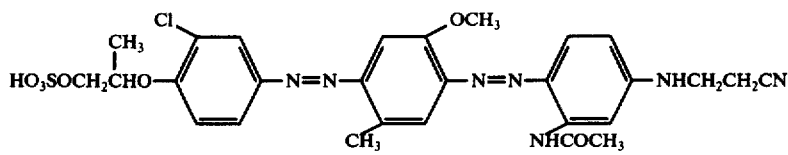

dyes polyamide materials in clear, bluish-tinged red shades having very good fastness properties.

EXAMPLE 10

26.75 parts of the acid sulphuric acid ester of ethylene glycol-(3-chlor-4-aminophenyl)-ether are diazotised in the customary manner in an aqueous solution containing hydrochloric acid and, following the procedure described in example 1, coupled to 22 parts of m-toluidinemethanesulphonic acid, the methanesulphonic acid radical split off and the product further diazotised. The suspension of the diazonium salt is run into a solution of 23 parts of N-β-cyanethyl-N'-propionyl-m-phenylenediamine in approx. 200 parts of dilute hydrochloric acid, adjusted to pH 3.5 with sodium acetate, with the pH value of 3.5 being maintained during coupling by adding sodium acetate solution. After completion of coupling, the dyestuff of formula is isolated and dried. It represents a dark brown powder which dyes polyamide filaments in clear scarlet shades.

EXAMPLE 11

Following the procedure described in example 1, 30.2 parts of the acid sulphuric acid ester of ethylene glycol-(2,6-dichlor-4-aminophenyl)-ether are diazotised, coupled to m-toluidinemethanesulphonic acid, the methanesulphonic acid radical split off and the product further diazotised. The final coupling,, to 25 parts of N-β-cyanethyl-N'-methylsulphonyl-m-phenylenediamine, is carried out under the same conditions as described in example 1. After isolation, 58 parts of the dyestuff of formula

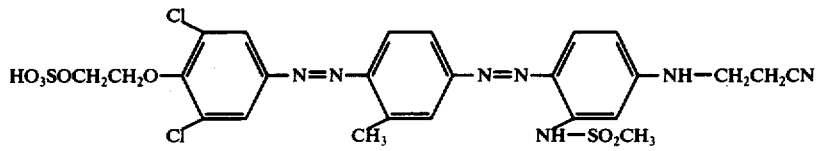

which dyes polyamide filaments in clear ruby shades having good to very good fastness properties, are obtained.

EXAMPLE 12

Following the procedure described in example 1, 24.7 parts of the acid sulphuric acid ester of ethylene glycol-(3-methyl-4-aminophenyl)-ether are diazotised, coupled to 19.5 parts of anilinemethanesulphonic acid, the methanesulphonic acid radical split off and the product diazotised further. The final coupling, to 21.5 parts of N-β-cyanethyl-N'-acetyl-m-phenylenediamine, is carried out under the same conditions as described in example 1. After isolation, 51 parts of the dyestuff of formula diazonium salt suspension is thereafter allowed to run into a solution of 21.5 parts of N-β-cyanethyl-N'-acetyl-

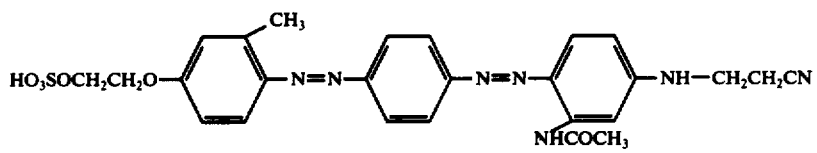

which dyes polyamide filaments in clear yellowish-tinged red shades, are obtained.

EXAMPLE 13

23.3 parts of the acid sulphuric acid ester of ethylene glycol-(4-aminophenyl)-ether are diazotised as described in example 1 and coupled to an aqueous suspension of 18 parts of α-naphthylamine hydrochloride, buffered to pH 2 with sodium acetate, with the pH value being kept at pH 2 - 2.5 during the coupling. After completion of coupling, the monoazo dyestuff formed is isolated and diazotised in approx. 300 parts of ethylene glycol monoethyl ether and 30 parts of sodium nitrite (as a 30% strength aqueous solution). The brown m-phenylenediamine in 200 parts of dilute hydrochloric acid, adjusted to pH 3.5 by means of sodium acetate. During coupling, the pH value is kept at pH 3.5 by means of sodium acetate. After completion of coupling, the dyestuff of formula

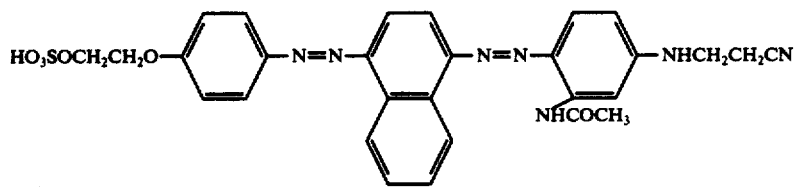

which has separated out is isolated and dried. It dyes polyamide materials in clear ruby shades having good fastness properties.

If the procedure indicated in the preceding examples is followed, using the starting components, middle components and end components indicated in the Table which follows, disazo dyestuffs are obtained which dye polyamide in the indicated colour shades.

|    | Starting component | Middle component | End component | Shade on Polyamide |
|----|---|---|---|---|
| 14 | Acid sulphuric acid ester of ethylene glycol-(4-amino-phenyl)-ether | aniline | N-methyl-aniline | orange |
| 15 | " | aniline | N-ethyl-aniline | orange |
| 16 | " | aniline | N-n-propyl-aniline | orange |
| 17 | " | aniline | N-n-butyl-aniline | orange |
| 18 | " | aniline | N-β-chlorethyl-aniline | orange |
| 19 | " | aniline | N-β-cyanethyl-aniline | orange |
| 20 | " | aniline | N-β-hydroxyethyl-aniline | orange |
| 21 | " | aniline | N-ethyl-m-toluidine | orange |
| 22 | " | aniline | N-β-cyanethyl-m-toluidine | orange |
| 23 | " | aniline | N-β-acetoxyethyl-m-toluidine | orange |
| 24 | " | aniline | N-β-methoxycarbonyloxy-ethyl-m-toluidine | orange |
| 25 | " | aniline | N-β-cyanethyl-3-methoxy aniline | orange |
| 26 | " | aniline | N-β-chlorethyl-3-chlor-aniline | orange |
| 27 | " | aniline | N-β-cyanethyl-3-chlor-aniline | orange |
| 28 | " | aniline | N-ethyl-N'-acetyl-m-phenylenediamine | yellowish-tinged red |
| 29 | " | aniline | N-β-cyanethyl-N'-hydroxy-acetyl-m-phenylenediamine | yellowish-tinged red |
| 30 | " | aniline | N-β-cyanethyl-N'-acetyl-m-penylenediamine | yellowish-tinged red |
| 31 | " | aniline | N-β-cyanethyl-N'-propionyl-m-phenylenediamine | yellowish-tinged red |
| 32 | " | aniline | N-β-cyanethyl-N'-benzoyl-m-phenylenediamine | yellowish-tinged red |
| 33 | " | aniline | N-β-cyanethyl-N'-methyl-sulphonyl-m-phenylenediamine | yellowish-tinged red |
| 34 | " | aniline | N-β-cyanethyl-N'-ethyl-sulphonyl-m-phenylene-diamine | yellowish-tinged red |
| 35 | " | aniline | N-β-cyanethyl-N'-methoxy-carbonyl-m-phenylenediamine | yellowish-tinged red |
| 36 | " | aniline | N-β-cyanethyl-N'-ethoxy-carbonyl-m-phenylenediamine | yellowish-tinged red |
| 37 | " | aniline | N-β-methoxycarbonyloxy-ethyl-N'-acetyl-m-phenylene- | red |

-continued

| | Starting component | Middle component | End component | Shade on Polyamide |
|---|---|---|---|---|
| 38 | " | aniline | N-β-carbomethoxyethyl-N'-acetyl-m-phenylenediamine | red |
| 39 | " | aniline | N-ethyl-2-methoxy-5-methyl-aniline | orange |
| 40 | " | aniline | N-β-cyanethyl-2-methoxy-5-methyl-aniline | orange |
| 41 | " | aniline | N-β-cyanethyl-2-ethoxy-5-methyl-aniline | orange |
| 42 | " | aniline | N-β-cyanethyl-m-anisidine | orange |
| 43 | " | aniline | N-β-cyanethyl-3-ethyl-aniline | orange |
| 44 | " | aniline | N-β-cyanethyl-3-ethoxy-aniline | orange |
| 45 | " | aniline | N-β-cyanethyl-3-brom-aniline | orange |
| 46 | " | aniline | N-β-cyanethyl-N'-benzene-sulphonyl-m-phenylenediamine | yellow-red |
| 47 | " | aniline | N-βcyanethyl-2-methyl-5-acetylamino-aniline | yellow-red |
| 48 | " | aniline | N-β-cyanethyl-2-methoxy-5-acetylamino-aniline | bluish-tinged red |
| 49 | " | aniline | N-β-carboethoxyethyl-aniline | orange |
| 50 | " | m-toluidine | N-methyl-aniline | orange |
| 51 | " | m-toluidine | N-n-propyl-aniline | orange |
| 52 | " | m-toluidine | N-i-propyl-aniline | orange |
| 53 | " | m-toluidine | N-i-butyl-aniline | orange |
| 54 | " | m-toluidine | N-β-cyanethyl-aniline | orange |
| 55 | " | m-toluidine | N-β-hydroxyethyl-aniline | orange |
| 56 | " | m-toluidine | N-β-chlorethyl-aniline | orange |
| 57 | " | m-toluidine | N-γ-hydroxypropyl-aniline | orange |
| 58 | " | m-toluidine | N-γ-chloropropyl-aniline | orange |
| 59 | " | m-toluidine | N-δ-chlorobutyl-aniline | orange |
| 60 | " | m-toluidine | N-β-acetoxyethyl-aniline | orange |
| 61 | " | m-toluidine | N-β-methoxycarbonyloxy-ethyl-aniline | orange |
| 62 | " | m-toluidine | N-β-ethoxycarbonyloxy-ethyl-aniline | orange |
| 63 | " | m-toluidine | N-β-carbomethoxyethyl-aniline | orange |
| 64 | " | m-toluidine | N-β-carboeethoxyethyl-aniline | orange |
| 65 | " | m-toluidine | N-methyl-m-toluidine | orange |
| 66 | " | m-toluidine | N-ethyl-m-toluidine | orange |
| 67 | " | m-toluidine | N-β-hydroxyethyl-m-toluidine | orange |
| 68 | " | m-toluidine | N-β-acetoxyethyl-m-toludine | orange |
| 69 | " | m-toluidine | N-β-methoxycarbonyloxy-ethyl-m-toluidine | orange |
| 70 | " | m-toluidine | N-β-ethoxycarbonyloxy-ethyl-m-toluidine | orange |
| 71 | " | m-toluidine | N-β-chlorethyl-m-toluidine | orange |
| 72 | " | m-toluidine | N-γ-chloropropyl-m-toluidine | orange |
| 73 | " | m-toludine | N-β-cyanethyl-m-toluidine | orange |
| 74 | " | m-toluidine | N-ethyl-3-ethyl-aniline | orange |
| 75 | " | m-toluidine | N-β-hydroxyethyl-3-ethyl-aniline | orange |
| 76 | " | m-toluidine | N-β-cyanethyl-3-ethyl-aniline | orange |
| 77 | " | m-toluidine | N-ethyl-3-chlor-aniline | orange |
| 78 | " | m-toluidine | N-ethyl-3-brom-aniline | orange |
| 79 | " | m-toluidine | N-β-cyanethyl-3-chlor-aniline | orange |
| 80 | " | m-toluidine | N-ethyl-m-anisidine | orange |
| 81 | " | m-toluidine | N-β-cyanethyl-m-anisidine | orange |
| 82 | " | m-toluidine | N-β-chlorethyl-m-anisidine | orange |
| 83 | " | m-toluidine | N-β-chlorethyl-3-chlor-aniline | orange |
| 84 | " | m-toluidine | N-β-acetoxyethyl-3-chlor-aniline | orange |
| 85 | " | m-toluidine | N-ethyl-3-ethoxy-aniline | orange |
| 86 | " | m-toluidine | N-β-cyanethyl-3-ethoxy-aniline | orange |
| 87 | " | m-toluidine | N-ethyl-N'-formyl-m-phenylenediamine | yellowish-tinged red |
| 88 | " | m-toluidine | N-ethyl-N'-acetyl-m-phenylenediamine | yellowish-tinged red |
| 89 | " | m-toluidine | N-ethyl-N'-benzoyl-m-phenylenediamine | yellowish-tinged red |
| 90 | " | m-toluidine | N-β-hydroxyethyl-N'-acetyl-m-phenylenediamine | yellowish-tinged red |
| 91 | " | m-toluidine | N-β-acetoxyethyl-N'-acetyl-m-phenylenediamine | yellowish-tinged red |
| 92 | " | m-toluidine | N-β-chlorethyl-N'-acetyl-m-phenylenediamine | yellowish-tinged red |
| 93 | " | m-toluidine | N-β-cyanethyl-N'-formyl-m-phenylenediamine | scarlet |
| 94 | " | m-toluidine | N-β-cyanethyl-N'-hydroxy-acetyl-m-phenylenediamine | scarlet |
| 95 | " | m-toluidine | N-β-cyanethyl-N'-propionyl- | scarlet |

-continued

| | Starting component | Middle component | End component | Shade on Polyamide |
|---|---|---|---|---|
| 96 | " | m-toluidine | N-β-cyanethyl-N'-benzoyl-m-phenylenediamine | scarlet |
| 97 | " | m-toluidine | N-β-cyanethyl-N'-methyl-sulphonyl-m-phenylene-diamine | scarlet |
| 98 | " | m-toluidine | N-β-cyanethyl-N'-ethyl-sulphonyl-m-phenylene-diamine | scarlet |
| 99 | " | m-toluidine | N-β-cyanethyl-N'-benzene-sulphonyl-m-phenylenediamine | scarlet |
| 100 | " | m-toluidine | N-β-cyanethyl-N'-toluene-sulphonyl-m-phenylenediamine | scarlet |
| 101 | " | m-toluidine | N-β-cyanethyl-N'-methoxy-carbonyl-m-phenylenediamine | scarlet |
| 102 | " | m-toluidine | N-β-cyanethyl-N'-ethoxy-carbonyl-m-phenylenediamine | scarlet |
| 103 | " | m-toluidine | N-β-carbomethyoxyethyl-N'-acetyl-m-phenylenediamine | scarlet |
| 104 | " | m-toluidine | N-ethyl-2-methoxy-5-methyl-aniline | yellowish-tinged red |
| 105 | " | m-toluidine | N-β-cyanethyl-2-methoxy-5-methyl-aniline | yellowish-tinged red |
| 106 | " | m-toluidine | N-β-hydroxyethyl-2-methoxy-5-methyl-aniline | yellowish-tinged red |
| 107 | " | m-toluidine | N-β-cyanethyl-2-ethoxy-5-methyl-aniline | yellowish-tinged red |
| 108 | " | m-toluidine | N-β-cyanethyl-2,5-dimethyl-aniline | orange |
| 109 | " | m-toluidine | N-β-cyanethyl-2-ethyl-5-acetylamino-aniline | bluish-tinged red |
| 110 | " | m-toluidine | N-ethyl-2-methoxy-5-acetylamino-aniline | bluish-tinged red |
| 111 | " | m-toluidine | N-ethyl-2-ethoxy-5-acetylamino-aniline | bluish-tinged red |
| 112 | " | m-toluidine | N-ethyl-2-methoxy-5-propionylamino-aniline | bluish-tinged red |
| 113 | " | m-toluidine | N-n-butyl-2-methoxy-5-acetylamino-aniline | bluish-tinged red |
| 114 | " | m-toluidine | N-β-hydroxyethyl-2-methoxy-5-acetylamino-aniline | bluish-tinged red |
| 115 | " | m-toluidine | N-β-acetoxyethyl-2-methoxy-5-acetylamino-aniline | bluish-tinged red |
| 116 | " | m-toluidine | N-β-methoxycarbonyloxy-ethyl-2-methoxy-5-acetyl-amino-aniline | bluish-tinged red |
| 117 | " | m-toluidine | N-β-chlorethyl-2-methoxy-5-acetylamino-aniline | bluish-tinged red |
| 118 | " | m-toluidine | N-β-cyanethyl-2-methoxy-5-formylamino-aniline | bluish-tinged red |
| 119 | " | m-toluidine | N-β-cyanethyl-2-methoxy-5-acetylamino-aniline | bluish-tinged red |
| 120 | " | m-toluidine | N-β-cyanethyl-2-ethoxy-5-acetylamino-aniline | bluish-tinged red |
| 121 | " | m-toluidine | N-β-cyanethyl-2-methoxy-5-hydroxyacetylamino-aniline | bluish-tinged red |
| 122 | " | m-toluidine | N-β-cyanethyl-2-methoxy-5-propionylamino-aniline | bluish-tinged red |
| 123 | " | m-toluidine | N-β-cyanethyl-2-methoxy-5-benzoylamino-aniline | bluish-tinged red |
| 124 | " | m-toluidine | N-β-cyanethyl-2-methoxy-5-benzenesulphonyl-amino-aniline | bluish-tinged red |
| 125 | " | m-toluidine | N-β-cyanethyl-2-methoxy-5-toluenesulphonylamino-aniline | bluish-tinged red |
| 126 | " | m-toluidine | N-β-cyanethyl-2-methoxy-5-methylsulphonylamino-aniline | bluish-tinged red |
| 127 | " | m-toluidine | N-β-cyanethyl-2-methoxy-5-ethylsulphonylamino-aniline | bluish-tinged red |
| 128 | " | m-toluidine | N-β-cyanethyl-2-methoxy-5-methoxycarbonylamino-aniline | bluish-tinged red |
| 129 | " | m-toluidine | N-β-cyanethyl-2-methoxy-5-ethoxycarbonylamino-aniline | bluish-tinged red |
| 130 | " | 3-amino-5-methoxy-toluene | N-ethyl-aniline | reddish-tinged orange |
| 131 | " | 3-amino-4-methoxy-toluene | N-β-cyanethyl-aniline | reddish-tinged orange |
| 132 | " | 3-amino-4-methoxy-toluene | N-β-hydroxyethyl-aniline | reddish-tinged orange |
| 133 | " | 3-amino-4-methoxy-toluene | N-β-cyanethyl-m-toluidine | reddish-tinged orange |
| 134 | " | 3-amino-4-methoxy-toluene | N-β-cyanethyl-3-chlor-aniline | reddish-tinged orange |
| 135 | " | 3-amino-4-methoxy-toluene | N-β-cyanethyl-m-anisidine | reddish-tinged orange |

-continued

| | Starting component | Middle component | End component | Shade on Polyamide |
|---|---|---|---|---|
| 136 | " | 3-amino-4-methoxy-toluene | N-β-chlorethyl-m-anisidine | reddish-tinged orange |
| 137 | " | 3-amino-4-methoxy-toluene | N-ethyl-N'-acetyl-m-phenylenediamine | bluish-tinged red |
| 138 | " | 3-amino-4-methoxy-toluene | N-β-cyanethyl-N'-hydroxy-acetyl-m-phenylenediamine | bluish-tinged red |
| 139 | " | 3-amino-4-methoxy-toluene | N-β-cyanethyl-N'-propionyl-m-phenylenediamine | bluish-tinged red |
| 140 | " | 3-amino-4-methoxy-toluene | N-β-cyanethyl-N'-benzoyl-m-phenylenediamine | bluish-tinged red |
| 141 | " | 3-amino-4-methoxy-toluene | N-β-cyanethyl-N'-benzene-sulphonyl-m-phenylenediamine | bluish-tinged red |
| 142 | " | 3-amino-4-methoxy-toluene | N-β-cyanethyl-N'-methyl-sulphonyl-m-phenylenediamine | bluish-tinged red |
| 143 | " | 3-amino-4-methoxy-toluene | N-β-cyanethyl-N'-methoxy-carbonyl-m-phenylenediamine | bluish-tinged red |
| 144 | " | 3-amino-4-methoxy-toluene | N-β-cyanethyl-2-methoxy-5-methyl-aniline | bluish-tinged red |
| 145 | " | 3-amino-4-methoxy-toluene | N-β-cyanethyl-2-methyl-5-acetylamino-aniline | bluish-tinged red |
| 146 | " | 3-amino-4-methoxy-toluene | N-β-chlorethyl-2-methoxy-5-acetylamino-aniline | ruby |
| 147 | " | 3-amino-4-methoxy-toluene | N-β-cyanethyl-2-methoxy-5-formylamino-aniline | ruby |
| 148 | " | 3-amino-4-methoxy-toluene | N-βcyanethyl-2-methoxy-5-acetylamino-aniline | ruby |
| 149 | " | 3-amino-4-methoxy-toluene | N-β-cyanethyl-2-methoxy-5-propionylamino-aniline | ruby |
| 150 | " | 3-amino-4- | N-β-cyanethyl-2-ethoxy-5-acetylamino-aniline | ruby |
| 151 | " | 3-amino-4-methoxy-toluene | N-β-cyanethyl-2-methoxy-5-benzenesulphonylamino-aniline | ruby |
| 152 | " | 3-amino-4-methoxy-toluene | N-β-cyanethyl-2-methoxy-5-methoxycarbonylamino-aniline | ruby |

EXAMPLE 153

Following the procedure described in example 1, 23.3 parts of the acid sulphuric acid ester of ethylene glycol-(4-aminophenyl)-ether are diazotised, coupled to m-toluidine-methanesulphonic acid, the methanesulphonic acid radical then split off, and the product further diazotised. The suspension of the diazonium salt is thereafter run into a solution of 18 parts of N-ethyl-N-β-cyanethylaniline in approx. 200 parts of dilute hydrochloric acid, adjusted to pH 3.5 by means of sodium acetate, with the pH value of the coupling solution being kept at pH 3.5 by addition of sodium acetate solution. After completion of coupling, approx. 5% of sodium chloride are added and the dyestuff which has separated out, of formula

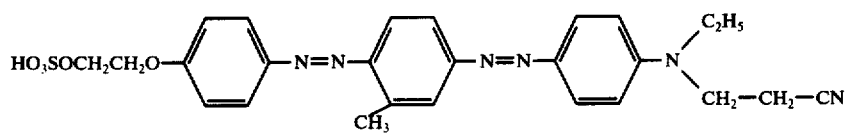

is isolated by filtration and dried. 45 parts of a light red dyestuff powder, which dyes polyamide filaments in clear orange shades having very good fastness properties, are obtained.

EXAMPLE 154

Following the procedure described in example 1, 26.75 parts of the acid sulphuric acid ester of ethylene glycol-(2-chlor-4-aminophenyl)- ether are diazotised, coupled to m-toluidinemethanesulphonic acid, the methanesulphonic acid radical split off, and the product diazotised further. The suspension of the diazonium salt is thereafter run into a solution of 35.4 parts of N,N-bis-(β-methoxycarbonyloxyethyl)-N'-acetyl-m-phenylenediamine in approx. 200 parts of dilute acetic acid and 50 parts of dimethylformamide, adjusted to pH 3.5 by means of sodium acetate. The pH value is kept at pH 3.5 - 4 during the coupling by addition of sodium acetate. After completion of the coupling, approx. 10% of sodium chloride are added and the dyestuff which has separated out, of formula

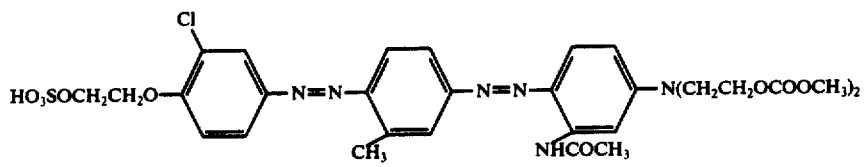

is isolated and dried. 70 parts of a dark red dyestuff powder, which dyes polyamide filaments in red shades having good to very good fastness properties, are obtained.

EXAMPLE 155

24.7 parts of the acid sulphuric acid ester of ethylene glycol-(3-methyl-4-aminophenyl)-ether are diazotised in the usual manner, coupled to 19.5 parts of anilinemethanesulphonic acid, the methanesulphonic acid radical split off and the product diazotised further. The suspension of the diazonium salt is run into a solution of 23.7 parts of N,N-bis-(β-chlorethyl)-m-toluidine in approx. 200 parts of dilute acetic acid, adjusted to pH 3 – 4 by means of sodium acetate solution, with the pH value of 3 – 4 being maintained during the coupling by addition of sodium acetate solution. After completion of coupling, the dyestuff of formula

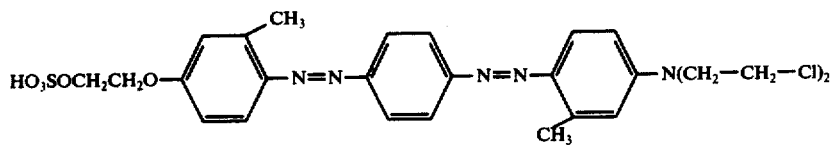

is completely precipitated by adding 10% of sodium chloride, and isolated. It dyes polyamide filaments in clear orange shades having good fastness properties.

The Table which follows lists further dyestuffs obtained according to the invention, which dye polyamide filaments in the indicated shades:

|     | Starting component | Middle component | End component | Shade on Polyamide |
| --- | --- | --- | --- | --- |
| 156 | Acid sulphuric acid ester of ethylene glycol-(4-aminophenyl)-ether | aniline | N,N-diethylaniline | orange |
| 157 | " | aniline | N,N-diethyl-m-toluidine | orange |
| 158 | " | aniline | N,N-diethyl-3-chlor-aniline | orange |
| 159 | " | aniline | N-ethyl-N-β-chlorethyl-aniline | orange |
| 160 | " | aniline | N-ethyl-N-β-cyanethyl-aniline | orange |
| 161 | " | aniline | N-butyl-N-β-cyanethyl-aniline | orange |
| 162 | " | aniline | N-ethyl-N-β-cyanethyl-m-toluidine | orange |
| 163 | " | aniline | N-ethyl-N-β-cyanethyl-3-chlor-aniline | orange |
| 164 | " | aniline | N-ethyl-N-β-cyanethyl-3-brom-aniline | orange |
| 165 | " | aniline | N,N-bis-(β-chlorethyl)-aniline | orange |
| 166 | " | aniline | N-ethyl-N-β-hydroxyethyl-aniline | orange |
| 167 | " | aniline | N-ethyl-N-β-acetoxyethyl-aniline | orange |
| 168 | " | aniline | N-β-acetoxyethyl-N-β-cyanethyl-aniline | orange |
| 169 | " | aniline | N-β-chlorethyl-N-β-cyanethyl-aniline | orange |
| 170 | " | aniline | N-bis-(β-hydroxyethyl)-aniline | orange |
| 171 | " | aniline | N-bis-(β-acetoxyethyl)-aniline | orange |
| 172 | " | aniline | N-bis-(β-methoxycarbonyl-oxyethyl)-aniline | orange |
| 173 | " | aniline | N-bis-(β-carbomethoxyethyl)-aniline | orange |
| 174 | " | aniline | N-butyl-N-β-cyanethyl-m-toluidine | orange |
| 175 | " | aniline | N-ethyl-N-β-chlorethyl-m-toluidine | orange |
| 176 | " | aniline | N-ethyl-N-β-hydroxyethyl-m-toluidine | orange |
| 177 | " | aniline | N-ethyl-N-β-acetoxyethyl-m-toluidine | orange |
| 178 | " | aniline | N-ethyl-N-β-methoxycarbonyl-oxyethyl-m-toluidine | orange |
| 179 | " | aniline | N,N-bis-(β-chlorethyl)-m-toluidine | orange |
| 180 | " | aniline | N,N-bis-(β-hydroxyethyl)-m-toluidine | orange |
| 181 | " | aniline | N,N-bis(β-acetoxyethyl)-m-toluidine | orange |
| 182 | " | aniline | N,N-bis-(β-methoxycarbonyloxy-ethyl)-m-toluidine | orange |

-continued

| | Starting component | Middle component | End component | Shade on Polyamide |
|---|---|---|---|---|
| 183 | " | aniline | N-ethyl-N-β-cyanethyl-3-ethyl-aniline | orange |
| 184 | " | aniline | N-ethyl-N-β-hydroxyethyl-3-ethyl-aniline | orange |
| 185 | " | aniline | N-ethyl-N-β-acetoxyethyl-3-ethyl-aniline | orange |
| 186 | " | aniline | N-ethyl-N-β-acetoxyethyl-3-chlor-aniline | orange |
| 187 | " | aniline | N-ethyl-N-β-cyanethyl-o-toluidine | orange |
| 188 | " | aniline | N-ethyl-N-β-acetoxyethyl-o-toluidine | orange |
| 189 | " | aniline | N,N-diethyl-m-anisidine | orange |
| 190 | " | aniline | N-ethyl-N-β-cyanethyl-m-anisidine | orange |
| 191 | " | aniline | N,N-diethyl-2,5-dimethyl-aniline | orange |
| 192 | " | aniline | N-ethyl-N-β-cyanethyl-2,5-dimethyl-aniline | orange |
| 193 | " | aniline | N-ethyl-N-β-hydroxyethyl-2,5-dimethyl-aniline | orange |
| 194 | " | aniline | N,N-diethyl-2,5-dimethoxy-aniline | orange |
| 195 | " | aniline | N-ethyl-N-β-cyanethyl-2,5-dimethoxy-aniline | orange |
| 196 | " | aniline | N-ethyl-N-β-hydroxyethyl-2-methoxy-5-methyl-aniline | orange |
| 197 | " | aniline | N-ethyl-N-β-cyanethyl-2-methoxy-5-methyl-aniline | orange |
| 198 | " | aniline | N,N-diethyl-N'-acetyl-m-phenylenediamine | yellowish-tinged red |
| 199 | " | aniline | N,N-diethyl-N'-propionyl-m-phenylenediamine | yellowish-tinged red |
| 200 | " | aniline | N-ethyl-N-β-hydroxyethyl-N'-acetyl-m-phenylenediamine | yellowish-tinged red |
| 201 | " | aniline | N-ethyl-N-β-acetoxyethyl-N'-acetyl-m-phenylenediamine | yellowish-tinged red |
| 202 | " | aniline | N,N-bis-(β-hydroxyethyl)-N'-acetyl-m-phenylenediamine | yellowish-tinged red |
| 203 | " | aniline | N,N-bis(β-acetoxyethyl)-N'-acetyl-m-phenylenediamine | yellowish-tinged red |
| 204 | " | aniline | N,N-bis-(β-methoxycarbonyloxyethyl)-N'-acetyl-m-phenylenediamine | yellowish-tinged red |
| 205 | " | aniline | N-ethyl-N-β-cyanethyl-N'-acetyl-m-phenylenediamine | yellowish-tinged red |
| 206 | " | aniline | N-ethyl-N-β-chlorethyl-N'-acetyl-m-phenylenediamine | yellowish-tinged red |
| 207 | " | aniline | N-ethyl-N-β-cyanethyl-N'-propionyl-m-phenylenediamine | yellowish-tinged red |
| 208 | " | aniline | N-ethyl-N-β-cyanethyl-N'-methoxycarbonyl-m-phenylenediamine | yellowish-tinged red |
| 209 | " | aniline | N-ethyl-N-β-cyanethyl-N'-benzenesulphonyl-m-phenylenediamine | yellowish-tinged red |
| 210 | " | aniline | N-ethyl-N-β-cyanethyl-N'-methylsulphonyl-m-phenylenediamine | yellowish-tinged red |
| 211 | " | aniline | N,N-diethyl-2-methoxy-5-acetylamino-aniline | red |
| 212 | " | aniline | N,N-bis(β-acetoxyethyl)-2-methoxy-5-acetylamino-aniline | red |
| 213 | " | aniline | N,N-bis-(β-methoxycarbonyloxyethyl)-2-methoxy-5-acetylamino-aniline | red |
| 214 | " | aniline | N,N-bis-(β-methoxycarbonyloxyethyl)-2-ethoxy-5-acetylamino-aniline | red |
| 215 | " | aniline | N-ethyl-N-β-cyanethyl-2-methoxy-5-acetylamino-aniline | red |
| 216 | " | aniline | N-β-acetoxyethyl-N-β-cyanethyl-2-methoxy-5-acetylamino-aniline | red |
| 217 | " | m-toluidine | N,N-diethylaniline | orange |
| 218 | " | m-toluidine | N-ethyl-N-n-butyl-aniline | orange |
| 219 | " | m-toluidine | N-ethyl-N-β-chlorethyl-aniline | orange |
| 220 | " | m-toluidine | N-n-butyl-N-β-cyanethyl-aniline | orange |
| 221 | " | m-toluidine | N-ethyl-N-β-hydroxyethyl-aniline | orange |
| 222 | " | m-toluidine | N-ethyl-N-β-acetoxyethyl-aniline | orange |
| 223 | " | m-toluidine | N-ethyl-N-β-methoxycarbonyloxyethyl-aniline | orange |
| 224 | " | m-toluidine | N,N-bis-(β-hydroxyethyl)-aniline | orange |
| 225 | " | m-toluidine | N,N-bis-(β-acetoxyethyl)- | orange |

-continued

| | Starting component | Middle component | End component | Shade on Polyamide |
|---|---|---|---|---|
| 226 | " | m-toluidine | N,N-bis-(β-methoxycarbonyloxy-ethyl)-aniline | orange |
| 227 | " | m-toluidine | N,N-bis-(β,γ-dihydroxy-propyl)-aniline | orange |
| 228 | " | m-toluidine | N,N-bis(β-chlorethyl)-aniline | orange |
| 229 | " | m-toluidine | N-ethyl-N-β-carbomethoxy-ethyl-aniline | orange |
| 230 | " | m-toluidine | N-β-chlorethyl-N-β-methoxy-carbonyloxyethyl-aniline | orange |
| 231 | " | m-toluidine | N-β-chlorethyl-N-β-cyanethyl-aniline | orange |
| 232 | " | m-toluidine | N-β-acetoxyethyl-N-β-cyanethyl-aniline | orange |
| 233 | " | m-toluidine | N,N-diethyl-m-toluidine | orange |
| 234 | " | m-toluidine | N,N-bis-(β-hydroxyethyl)-m-toluidine | orange |
| 235 | " | m-toluidine | N,N-bis-(β-acetoxyethyl)-m-toluidine | orange |
| 236 | " | m-toluidine | N,N-bis-(β-methoxycarbonyloxy-ethyl)-m-toluidine | orange |
| 237 | " | m-toluidine | N-ethyl-N-β-cyanethyl-m-toluidine | orange |
| 238 | " | m-toluidine | N-ethyl-N-β-chlorethyl-m-toluidine | orange |
| 239 | " | m-toluidine | N-ethyl-N-β-hydroxyethyl-m-toluidine | orange |
| 240 | " | m-toluidine | N-ethyl-N-β-acetoxyethyl-m-toluidine | orange |
| 241 | " | m-toluidine | N-ethyl-N-β-methoxycarbonyloxy-ethyl-m-toluidine | orange |
| 242 | " | m-toluidine | N-n-butyl-N-β-methoxy-carbonyloxyethyl-m-toluidine | orange |
| 243 | " | m-toluidine | N-n-butyl-N-β-acetoxyethyl-m-toluidine | orange |
| 244 | " | m-toluidine | N-β-chlorethyl-N-β-acetoxy-ethyl-m-toluidine | orange |
| 245 | " | m-toluidine | N-β-cyanethyl-N-β-acetoxy-ethyl-m-toluidine | orange |
| 246 | " | m-toluidine | N,N-bis-(β-chlorethyl)-m-toluidine | orange |
| 247 | " | m-toluidine | N,N-diethyl-3-ethyl-aniline | orange |
| 248 | " | m-toluidine | N-ethyl-N-β-cyanethyl-3-ethyl-aniline | orange |
| 249 | " | m-toluidine | N-ethyl-N-β-hydroxyethyl-3-ethyl-aniline | orange |
| 250 | " | m-toluidine | N,N-diethyl-3-chlor-aniline | orange |
| 251 | " | m-toluidine | N-ethyl-N-β-cyanethyl-3-chlor-aniline | orange |
| 252 | " | m-toluidine | N-ethyl-N-β-chlorethyl-3-chlor-aniline | orange |
| 253 | " | m-toluidine | N-ethyl-N-β-acetoxyethyl-3-chlor-aniline | orange |
| 254 | " | m-toluidine | N,N-diethyl-3-brom-aniline | orange |
| 255 | " | m-toluidine | N-ethyl-N-β-cyanethyl-3-brom-aniline | orange |
| 256 | " | m-toluidine | N,N-diethyl-m-anisidine | orange |
| 257 | " | m-toluidine | N-ethyl-N-β-cyanethyl-m-anisidine | orange |
| 258 | " | m-toluidine | N,N-diethyl-2,5-dimethyl-aniline | orange |
| 259 | " | m-toluidine | N-ethyl-N-cyanethyl-2,5-dimethyl-aniline | orange |
| 260 | " | m-toluidine | N-ethyl-N-β-chlorethyl-2,5-dimethyl-aniline | orange |
| 261 | " | m-toluidine | N,N-diethyl-o-toluidine | orange |
| 262 | " | m-toluidine | N-ethyl-N-β-cyanethyl-o-toluidine | orange |
| 263 | " | m-toluidine | N-ethyl-N-β-acetoxyethyl-o-toluidine | orange |
| 264 | " | m-toluidine | N,N-diethyl-2,5-dimethoxy-aniline | orange |
| 265 | " | m-toluidine | N-ethyl-N-β-cyanethyl-2,5-dimethoxy-aniline | orange |
| 266 | " | m-toluidine | N-ethyl-N-β-hydroxyethyl-2-methoxy-5-methyl-aniline | orange |
| 267 | " | m-toluidine | N-ethyl-N-β-cyanethyl-2-methoxy-5-methyl-aniline | orange |
| 268 | " | m-toluidine | N,N-diethyl-N'-acetyl-m-phenylenediamine | red |
| 269 | " | m-toluidine | N,N-diethyl-N'-propionyl-m-phenylenediamine | red |
| 270 | " | m-toluidine | N,N-diethyl-N'-methyl-sulphonyl-m-phenylenediamine | red |
| 271 | " | m-toluidine | N,N-diethyl-N'-benzene-sulphonyl-m-phenylenediamine | red |
| 272 | " | m-toluidine | N,N-diethyl-N'-methoxycarbonyl-m-phenylendiamine | red |
| 273 | " | m-toluidine | N-ethyl-N-β-hydroxyethyl-N'-acetyl-m-phenylenediamine | red |

-continued

| | Starting component | Middle component | End component | Shade on Polyamide |
|---|---|---|---|---|
| 274 | " | m-toluidine | N-ethyl-N-β-acetoxyethyl-N'-acetyl-m-phenylenediamine | red |
| 275 | " | m-toluidine | N-ethyl-N-β-cyanethyl-N'-acetyl-m-phenylenediamine | red |
| 276 | " | m-toluidine | N-ethyl-N-β-cyanethyl-N'-propionyl-m-phenylenediamine | red |
| 277 | " | m-toluidine | N,N-bis-(β-hydroxyethyl)-N'-acetyl-m-phenylenediamine | red |
| 278 | " | m-toluidine | N,N-bis-(β-acetoxyethyl)-N'-acetyl-m-phenylenediamine | red |
| 279 | " | m-toluidine | N,N-bis-(β-methoxycarbonyl-oxyethyl)-N'-acetyl-m-phenylenediamine | red |
| 280 | " | m-toluidine | N-ethyl-N-β-chlorethyl-N'-acetyl-m-phenylenediamine | red |
| 281 | " | m-toluidine | N-β-cyanethyl-N-β-hydroxy-ethyl-N'-acetyl-m-phenylenediamine | red |
| 282 | " | m-toluidine | N-β-cyanethyl-N-β-acetoxy-ethyl-N'-acetyl-m-phenylenediamine | red |
| 283 | " | m-toluidine | N,N-diethyl-2-methoxy-5-acetylamino-aniline | bluish-tinged red |
| 284 | " | m-toluidine | N,N-bis-(β-hydroxyethyl-2-methoxy-5-acetylamino-aniline | bluish-tinged red |
| 285 | " | m-toluidine | N,N-bis-(β-acetoxyethyl)-2-methoxy-5-acetylamino-aniline | bluish-tinged red |
| 286 | " | m-toluidine | N,N-bis-(β-methoxycarbonyl-oxyethyl)-2-methoxy-5-acetylamino-aniline | bluish-tinged red |
| 287 | " | m-toluidine | N-ethyl-N-β-cyanethyl-2-methoxy-5-acetylamino-aniline | bluish-tinged red |
| 288 | " | m-toluidine | N-β-hydroxyethyl-N-β-cyanethyl-2-methoxy-5-acetylamino-aniline | bluish-tinged red |
| 289 | " | 3-amino-4-methoxy-toluene | N,N-diethylaniline | reddish-tinged orange |
| 290 | " | 3-amino-4-methoxy-toluene | N-ethyl-N-β-cyanethyl-aniline | reddish-tinged orange |
| 291 | " | 3-amino-4-methoxy-toluene | N-ethyl-N-β-hydroxyethyl-aniline | reddish-tinged orange |
| 292 | " | 3-amino-4-methoxy-toluene | N-ethyl-N-β-cyanethyl-m-toluidine | reddish-tinged orange |
| 293 | " | 3-amino-4-methoxy-toluene | N-ethyl-N-β-cyanethyl-3-chlor-aniline | reddish-tinged orange |
| 294 | " | 3-amino-4-methoxy-toluene | N-ethyl-N-β-chlorethyl-m-anisidine | reddish-tinged orange |
| 295 | " | 3-amino-4-methoxy-toluene | N,N-diethyl-N'-acetyl-m-phenylenediamine | bluish-tinged red |
| 296 | " | 3-amino-4-methoxy-toluene | N-ethyl-N-β-hydroxyethyl-N'-acetyl-m-phenylenediamine | bluish-tinged red |
| 297 | " | 3-amino-4-methoxy-toluene | N-ethyl-N-β-cyanethyl-N'-acetyl-m-phenylenediamine | bluish-tinged red |
| 298 | " | 3-amino-4-methoxy-toluene | N-ethyl-N-β-cyanethyl-2-methoxy-5-methyl-aniline | bluish-tinged red |
| 299 | " | 3-amino-4-methoxy-toluene | N-ethyl-N-β-cyanethyl-2-methoxy-5-acetylamino-aniline | ruby |
| 300 | " | 3-amino-4-methoxy-toluene | N,N-bis-(β-hydroxyethyl)-2-methoxy-5-acetylamino-aniline | ruby |
| 301 | " | 3-amino-4-methoxy-toluene | N,N-bis-(β-methoxycarbonyloxy-ethyl)-2-methoxy-5-acetyl-amino-aniline | ruby |

If instead of the acid sulphuric acid ester of ethylene glycol-(4-aminophenyl)-ether, the acid sulphuric acid esters of ethylene glycol-(2-chlor-4-aminophenyl)-ether, ethylene glycol-(3-chlor-4-aminophenyl)-ether, ethylene glycol-(2,6-dichlor-4-aminophenyl)-ether, ethylene glycol-(2,3-dichlor-4-aminophenyl)-ether, ethylene glycol-(2,5-dichlor-4-aminophenyl)-ether, ethylene glycol-(3,5-dichlor-4-aminophenyl)-ether, ethylene glycol-(2,3,5-trichlor-4-aminophenyl)-ether, ethylene glycol-(2,3,6-trichlor-4-aminophenyl)-ether, ethylene glycol-(2,3,5,6-tetrachlor-4-aminophenyl)-ether, ethylene glycol-(2-brom-4-aminophenyl)-ether, ethylene glycol-(3-brom-4-aminophenyl)-ether, ethylene glycol-(2-methoxy-4-aminophenyl)-ether, ethylene glycol-(3-methoxy-4-aminophenyl)-ether, ethylene glycol-(2-ethoxy-4-aminophenyl)-ether, ethylene glycol-(3-methoxy-4-aminophenyl)-ether, ethylene glycol-(3-ethoxy-4-aminophenyl)-ether, ethylene glycol-(2-ethyl- 4-aminophenyl)-ether, ethylene glycol-(3-ethyl-4-aminophenyl)-ether, ethylene glycol-(2-chloro-5-methoxy-4-aminophenyl)-ether, ethylene glycol-(2-methyl-4-aminophenyl)-ether or ethylene glycol-(3-methyl-4-aminophenyl)-ether are used as the starting component, aniline, m-toluidine, 3-amino-4-methoxy-toluene, 2-amino-toluene, 2-amino-toluene, 2-amino-ethylbenzene, 3-amino-ethylbenzene, 3-chloraniline, 3-bromaniline, 2-amino-anisole, 3-aminoanisole, 2-aminoethoxybenzene, 3-aminoethoxybenzene, 1-amino-ethoxybenzene, 1-amino-2,3-dimethylbenzene, 1-amino-2,5-dimethylbenzene, 1-amino-3,5-dimethylbenzene, 2-amino-4-methoxy-toluene, 2-amino-1,4-dimethoxy-benzene, 2-amino-4-ethoxytoluene, 2-amino-1,4-diethoxybenzene or α-naphthylamine are used as the middle component, and the end components indicated in the Tables are used as the end components, dyestuffs which dye polyamide in orange, red and ruby shades are again obtained.

Instead of the acid sulphuric acid ester of ethylene glycol, the acid sulphuric acid esters of trimethylene glycol or propylene glycol can also be used.

I claim:
1. Disazo dyestuff of the formula

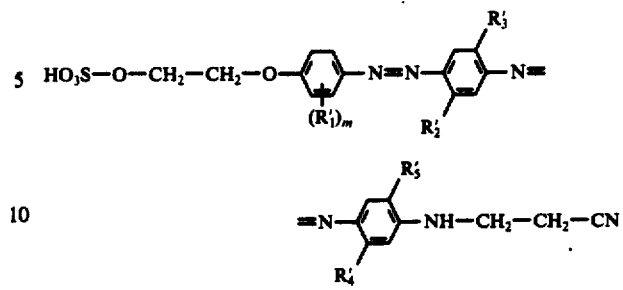

in which
R'₁ is chlorine or methyl;
R'₂ is hydrogen, chlorine, methyl, or methoxy;
R'₃ is hydrogen or methoxy;
R'₄ is hydrogen, chlorine, methyl, formylamino, acetylamino, hydroxyacetylamino, benzoylamino, methoxycarbonylamino, ethoxycarbonylamino, benzenesulfonylamino, toluenesulfonylamino, methylsulfonylamino, or ethylsulfonylamino;
R'₅ is hydrogen, methyl, or methoxy;
and m is a number from 0 to 2.
2. Disazo dyestuff of the formula

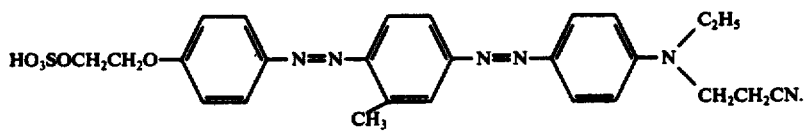

* * * * *